(12) United States Patent
David et al.

(10) Patent No.: US 10,382,460 B2
(45) Date of Patent: Aug. 13, 2019

(54) REPORTING AND PROCESSING CONTROLLER SECURITY INFORMATION

(71) Applicant: Karamba Security, Hod Hasharon (IL)

(72) Inventors: Tal Efraim Ben David, Hogla (IL); Assaf Harel, Ramat Hasharon (IL); Amiram Dotan, Birmingham, MI (US); David Barzilai, Hod Hasharon (IL)

(73) Assignee: KARAMBA SECURITY LTD., Hod Hasharon (IL)

( * ) Notice: Subject to any disclaimer, the term of this patent is extended or adjusted under 35 U.S.C. 154(b) by 0 days.

(21) Appl. No.: 16/012,206

(22) Filed: Jun. 19, 2018

(65) Prior Publication Data

US 2018/0316699 A1   Nov. 1, 2018

Related U.S. Application Data

(63) Continuation of application No. PCT/IB2017/051965, filed on Apr. 5, 2017.
(Continued)

(51) Int. Cl.
*H04L 29/06* (2006.01)
*G06F 21/00* (2013.01)
(Continued)

(52) U.S. Cl.
CPC ........ *H04L 63/1416* (2013.01); *G06F 21/552* (2013.01); *G06F 21/56* (2013.01);
(Continued)

(58) Field of Classification Search
CPC ... H04L 63/1416; H04L 63/20; H04L 63/145; H04L 63/1425; H04L 2209/84;
(Continued)

(56) References Cited

U.S. PATENT DOCUMENTS 8,090,816 B1 * 1/2012 Deshmukh ............ G06F 21/554
                                                      709/223
8,555,385 B1 * 10/2013 Bhatkar ................ G06F 21/556
                                                      726/22
(Continued)

FOREIGN PATENT DOCUMENTS

EP              2892199        7/2015
WO      WO 2013/063474        5/2013
WO      WO 2016/046819        3/2016

OTHER PUBLICATIONS

International Search Report and Written Opinion in International Application No. PCT/IB2017/051964, dated Jun. 26, 2017, 19 pages.
(Continued)

*Primary Examiner* — Lisa C Lewis
(74) *Attorney, Agent, or Firm* — Finnegan, Henderson, Farabow, Garrett & Dunner, LLP (57) ABSTRACT

In one implementation, a method for providing security on externally connected controllers includes receiving, at a reporting agent that is part of a security middleware layer operating on a controller, an indication that a process has been blocked; obtaining, by the reporting agent, trace information for the blocked process; determining, by the reporting agent, a code portion in an operating system of the controller that served as an exploit for the blocked process; obtaining, by the reporting agent, a copy of malware that was to be executed by the blocked process; generating, by the reporting agent, an alert for the blocked process that includes (i) the trace information, (ii) information identifying the code portion, and (iii) the copy of the malware; and providing, by the reporting agent, the alert to a network interface on the controller for immediate transmission to a backend computer system.

18 Claims, 7 Drawing Sheets

Related U.S. Application Data (60) Provisional application No. 62/346,973, filed on Jun. 7, 2016, provisional application No. 62/319,178, filed on Apr. 6, 2016.

(51) Int. Cl.
*G06F 21/55* (2013.01)
*G06F 21/56* (2013.01)
*H04W 4/40* (2018.01)
*H04W 4/02* (2018.01)

(52) U.S. Cl.
CPC .......... *G06F 21/566* (2013.01); *H04L 63/145* (2013.01); *H04L 63/1425* (2013.01); *H04L 63/20* (2013.01); *H04W 4/02* (2013.01); *H04W 4/40* (2018.02); *H04L 2209/84* (2013.01)

(58) Field of Classification Search
CPC ........... H04W 4/40; H04W 4/02; G06F 21/56; G06F 21/566; G06F 21/552
See application file for complete search history.

(56) References Cited

U.S. PATENT DOCUMENTS

| | | |
|---|---|---|
| 2010/0251328 A1 | 9/2010 | Syed et al. |
| 2011/0083186 A1* | 4/2011 | Niemela ............... G06F 21/566 726/24 |
| 2013/0086625 A1 | 4/2013 | Driscoll et al. |
| 2013/0097660 A1* | 4/2013 | Das ........................ H04L 63/10 726/1 |
| 2013/0097708 A1* | 4/2013 | Jayanthi ............... G06F 21/554 726/25 |
| 2013/0188483 A1* | 7/2013 | Teepell ............... H04L 43/0876 370/235 |
| 2013/0247165 A1* | 9/2013 | Pal ......................... H04L 63/08 726/10 |
| 2014/0136710 A1 | 5/2014 | Benari et al. |
| 2014/0283067 A1* | 9/2014 | Call .................... H04L 63/1425 726/23 |
| 2015/0150124 A1 | 5/2015 | Zhang et al. |
| 2016/0149887 A1* | 5/2016 | Katmor ............... H04L 63/0263 726/1 |
| 2017/0200323 A1* | 7/2017 | Allouche ............... G07C 5/008 |
| 2018/0316692 A1* | 11/2018 | David ................. H04L 63/0428 |

OTHER PUBLICATIONS

International Search Report and Written Opinion in International Application No. PCT/IB2017/051965, dated Aug. 18, 2017, 20 pages.
International Search Report and Written Opinion in International Application No. PCT/IB2017/051967, dated Jun. 12, 2017, 17 pages.
Anonymous, "Method for protecting code from running in unlicensed environinents", ip.com Journal, Jun. 17, 2014, 1-2.
International Search Report and Written Opinion in International Application No. PCT/IB2017/051955, dated Jun. 19, 2017, 22 pages.

* cited by examiner

REPORTING AND PROCESSING CONTROLLER SECURITY INFORMATION

CROSS-REFERENCE TO RELATED APPLICATION

This application is a continuation of PCT Application No. PCT/IB2017/051965 filed Apr. 5, 2017, which claims priority to U.S. Application Ser. No. 62/319,178, filed on Apr. 6, 2016, and U.S. Application Ser. No. 62/346,973, filed Jun. 7, 2016, the disclosures of which are incorporated herein by reference.

TECHNICAL FIELD

This specification generally relates to security for computer-based controllers, such as controllers for Internet of Things (IoT) devices.

BACKGROUND

More devices are becoming "smarter" with hardware and software that permit them to communicate via the internet, such as through cellular wireless networks, Wi-Fi, and Bluetooth. These internet-connected devices are often identified as being part of the "Internet of Things" (IoT), which is a term that broadly encompasses internet-connected devices configured to transmit and receive information related to their operation, such as status information. For example, many consumer products are now IoT devices with internet-connected features, such as home automation devices (e.g., wirelessly controllable light switches), appliances (e.g., smart refrigerators able to transmit images of the fridge's contents), and automobiles (e.g., internet-connected components, such as infotainment and navigation devices). For instance, modern vehicles can have over 100 controllers, or Electronic Control Units (ECUs), that are responsible for running most of the car's functions, such as the steering wheel, engine, braking system, airbags, and navigation systems.

Like any other externally connected computers, IoT devices (e.g., ECUs in connected cars) are vulnerable to cyber attack and have become targets for hackers. For example, controllers on several makes and models of cars, such as the JEEP CHEROKEE, TOYOTA PRIUS, TESLA MODEL S, and NISSAN LEAF, have been successfully targeted and exploited by white hat hackers. Those hackers were able to compromise the vehicles and take command of nearly all of the control aspects, ranging from turning on the radio and windshield wipers to killing the engine while the car drove on the freeway. These exploits caused some of these car manufacturers to issue a recall on affected vehicles.

Cyber attacks come in many forms and flavors, but they generally share the same basic concepts: find a preexisting security bug (vulnerability) in the system's software, exploit it, and run malware. A common security bugs is neglecting to verify the size of input buffers, which hackers can exploit by passing long buffers that get out of the boundaries allocated for that buffer on the software stack. By getting out of the buffer boundaries, hackers may be able to access and change the pointer structure that controls the functional flow of code, which hackers can use to direct the controller to execute malware code. Although malware code can vary (e.g., keylogger, ransomware, e-mail spam), the exploitation mechanism is often similar—find a security bug, research and learn how to exploit it in order to gain control, and use the control to run the malware code.

SUMMARY

This document generally describes a technological solution that hardens externally connected controllers (e.g., ECUs) within an IoT device (e.g., connected automobile) against hackers. Customized security policies for controllers can be automatically generated and added to controllers with security layers without having to modify the underlying controller software. Such security policies and layers be implemented on controllers to ensure that only valid code and valid behaviors are allowed to run on the controllers, which can maintain secure operation and prevent the attacks from ever infiltrating the IoT device's infrastructure, such as a car's Controller Area Network (CAN Bus).

By focusing on hardening the controllers within IoT devices/systems that are open to external access (via the Internet, WiFi, Bluetooth, etc.)—meaning restricting the operations and behavior of the controllers to a set of expected operations and behaviors—the controllers can be transformed from potential security vulnerabilities into gates that prevent and block hacker attempts to get into the controller's internal infrastructure, essentially stopping hacker attacks on IoT devices. Endpoint security layers can stop attacks on controller by blocking hackers at the gate—meaning an externally facing entry point into a device and/or system, such as at externally facing ECUs in an automobile that, if compromised, could provide access to the CAN Bus. As a result, attacks cannot make it inside of an IoT device/system, which can prevent access to and control of an IoT device/system's functions.

This document describes four general aspects. First, automatic security policy generation which includes automatically generating custom security policies that can be implemented on controllers without manual design. Second, secure controller operation and malware prevention using custom security policies that have been incorporated into controllers. Third, securely logging and reporting information on controller operation, such as the current status of a controller and blocked malware attempts, back to a central management computer system in real time without affecting controller performance/operation. Fourth, providing a centralized computer system to aggregate information from multiple devices using the same controllers, to provide for global device/controller views and analytics, including identifying and detecting anomalous controller operation.

While this document describes all four of these aspects, this document focuses the third aspect—securely logging and reporting information on controller operation, such as the current status of a controller and blocked malware attempts, back to a central management computer system in real time without affecting controller performance/operation.

In one implementation, a method for providing security on externally connected controllers includes receiving, at a reporting agent that is part of a security middleware layer operating on a controller, an indication that a process has been blocked; obtaining, by the reporting agent, trace information for the blocked process; determining, by the reporting agent, a code portion in an operating system of the controller that served as an exploit for the blocked process; obtaining, by the reporting agent, a copy of malware that was to be executed by the blocked process; generating, by the reporting agent, an alert for the blocked process that includes (i) the trace information, (ii) information identifying the code portion, and (iii) the copy of the malware; and providing, by the reporting agent, the alert to a network interface on the controller for immediate transmission to a backend computer system.

Such a method can optionally include one or more of the following features, which can be combined in each possible sub-combination of features. The method can further include determining, by the reporting agent, a current status of the controller. Information identifying the current status can be additionally included in the alert. The current status can include current levels of use for one or more resources on the controller. The one or more resources can include a processor, memory, and networking transmission capacity through the network interface. The current status can include current network connections that are established for the controller through the network interface. The current status can include a snapshot of a software stack that identifies current process calls on the controller. The method can further include determining, by the reporting agent, a current context of the controller. Information identifying the current context can be additionally included in the alert. The current context can include a geographic location where the controller is currently located. The current context can include a current operational state for a device or system of which the controller is a part. The controller can be an automotive controller and the device or system is a vehicle. The security middleware layer can further include (i) a custom security policy defining permitted operations on the controller and (ii) one or more security agents that operate at a kernel-level on the controller to enforce the security policy.

In another implementation, a method for providing security on externally connected controllers includes receiving, at a reporting agent that is part of a security middleware layer operating on a controller, an indication that a process has been permitted to operate, wherein the security middleware layer further includes (i) a custom security policy defining permitted operations on the controller and (ii) one or more security agents that operate at a kernel-level on the controller to enforce the security policy; determining, by the reporting agent, a current status of the controller; generating, by the reporting agent, an log for the permitted process that includes (i) information identifying the permitted process and (ii) information identifying the current; and adding, by the reporting agent, the log to a reporting queue to be flushed through a network interface on the controller when one or more network parameters are satisfied.

Such a method can optionally include one or more of the following features, which can be combined in each possible sub-combination of features. The current status can include current levels of use for one or more resources on the controller. The one or more resources can include a processor, memory, and networking transmission capacity through the network interface. The current status can include current network connections that are established for the controller through the network interface. The current status can include a snapshot of a software stack that identifies current process calls on the controller. The method can further include determining, by the reporting agent, a current context of the controller. Information identifying the current context can be additionally included in the log. The current context can include a geographic location where the controller is currently located. The current context can include a current operational state for a device or system of which the controller is a part. The controller can be an automotive controller and the device or system is a vehicle.

Certain implementations can provide one or more of the following advantages. For example, endpoint controller security can us an operating system (OS) agnostic security agent and is built with an OS-specific middleware and a general purpose security agent. Such a security agent can be deployed in externally connected controllers to perform a variety of security-related functions, such as enforcing automatically generated security policies, collecting forensics information and upload it to the cloud, and/or providing anti-tampering features to prohibit hackers from circumventing the security agents. Such OS-agnostic agents can allow for endpoint security to be readily configured and deployed across a wide variety of vehicle controllers and OS environments.

In another example, the system can be integrated with the OEM/manufacturer build environment for controllers to automatically generate security agents and policies that are specific to the controllers, which can then be deployed to harden controllers and prevent security breaches. For instance, a client (or other software application/module) integrated into a build environment for a controller can scan the code and the binary for the controller, and automatically generate a security policy that is specific to the controller. Such scanning and automatic generation can include, for example, using static analysis tools and techniques to identify the universe of permitted processes, binaries, scripts, network usage, and/or other controller behaviors that are used to generate a customized security policy for the controller. Such as security policy can include, for example, a whitelist (e.g., identification of permitted processes, binaries, functions, operations), network firewall (e.g., identification of permitted network ports, IP addresses), functional graph (e.g., mapping and/or sequence of functions performed by a controller), and/or additional features that model permitted/designed behavior of the controller. Such automatic security policy generation (e.g., during build, due to static analysis (and other tools, such as simply signing on binaries to add to a whitelist)) can permit for endpoint security to be added to controllers with little to no effort on behalf of controller manufacturers/vendors, who can simply run the automated security policy generator prior to deployment in order to add endpoint security to their controller.

In a further example, a server system (e.g., cloud-base system) can be used to manage and monitor controllers that are hardened with endpoint security. Such as server system can processes and generate reports regarding controllers, such as information on detected and blocked malware, the current state of controllers in a vehicle, and/or other relevant information. Such reports can be at any of a variety of levels of granularity, from vehicle-specific views to manufacturer-specific views to the industry-wide views, which can be based on aggregated and anonymized user/vehicle/manufacturer information. For instance, a server system can collect forensics information in order to display incident reports based on malware detection, to calculate anomaly detection, to display current state of cars on the roads, to provide a management console in order to enhance policies (in production and during build—i.e. the cloud system is also connected to the project while it's being developed), and/or other relevant features. Such features can allow for manufacturers, vendors, and/or other interested/authorized parties (e.g., government agencies) to better understand both the micro and the macro security threats that are posed by externally connected controllers as well as the current security status (e.g., secure, under attack) of vehicles on the road. Such features can additionally permit for anomaly detection based prevention, such as through analyzing device measurements (e.g., CPU load, memory usage, I/O usage, etc.) that, by themselves, are not statistically significant, but when analyzed over time can indicate anomalies. For example, taking device measurements over time, average values (e.g., avg. CPU load, avg. memory usage, avg. I/O usage, etc.) can be determined, and when N>x, the standard deviation of the average is so small (e.g., alpha<0.00001) that it can serve as a base line for anomaly prevention and not just detection—meaning it can be accurate enough to block anomalies before/while they are occurring instead of after they have occurred.

In another example, endpoint controller security can permit detection that is much earlier than network-based solutions, which often are not able to detect that malware has compromised a controller until after the malware has had a chance to run. In contrast, endpoint security detects the malware before it has a chance to run on a controller, which not only prevents the malware from ever being executed but also determines that an operation is malware before it has been executed.

In a further example, endpoint security can readily be retrofitted for existing externally connected controllers that were not originally designed or manufactured with endpoint security in mind. This is possible through the automatic security policy generation features described above, which allow for security policies to be generated and readily deployed for controllers with little effort from manufacturers/vendors, and allow for endpoint security to be added to controllers through simple controller updates. Retrofitting can enhance security versions for existing vehicles on the road today, regardless of whether they were originally designed to include endpoint security.

In another example, rather than looking for hackers that are already in an IoT device/system's internal network (e.g., CAN Bus, internally-facing controllers), the disclosed technology can detect and stop an attack from getting into the internal network (e.g., CAN Bus, other controllers) in the first place. For example, the disclosed end-point solution can provide an early intrusion detection system that can protect externally connected controllers, which can allow for early intrusion detection and identification of threats targeting the IoT device/system and blocking exploits from infiltrating its internal components, which can ensure device/system and/or user safety.

Additional and/or alternative advantages are also possible, as described below.

BRIEF DESCRIPTION OF THE ATTACHMENTS

Like reference numbers and designations in the various drawings indicate like elements.

DETAILED DESCRIPTION

Figure 1A:
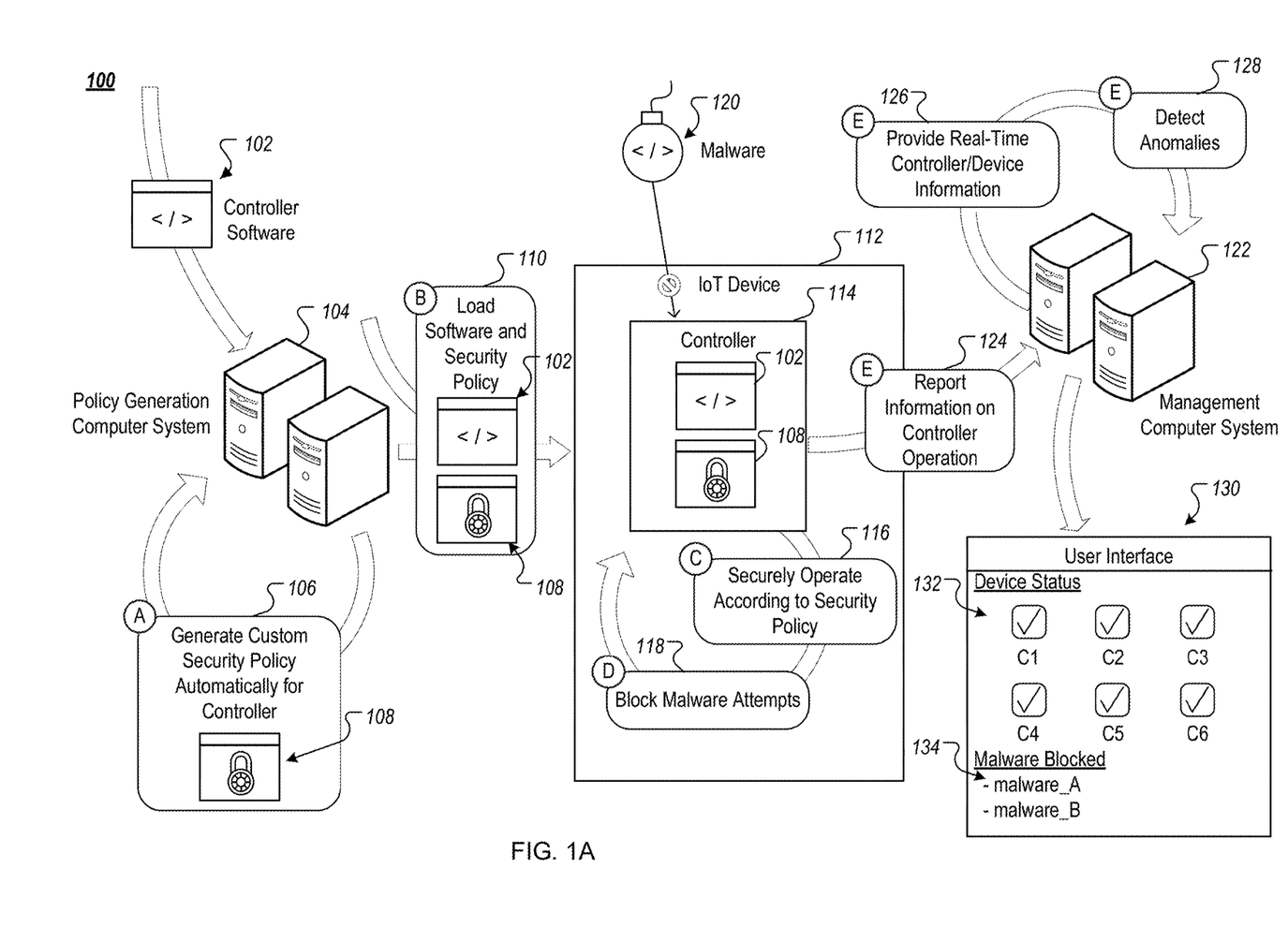
FIG. 1A is a conceptual diagram of an example system for generating and implementing a custom security policy on an example controller.

FIG. 1A is a conceptual diagram of an example system 100 for generating and implementing a custom security policy on an example controller. The example system 100 includes a policy generation computer system 104 (e.g., computer server system, cloud computing system, client computing device) that is programmed to automatically generate a custom security policy for a controller, an example IoT device 112 (e.g., ECU) that includes an example controller 114 that will use the generated security policy to operate securely and to prevent malware, and a management computer system 122 (e.g., computer server system, cloud computing system, client computing device) that is programmed to receive real-time controller information, to detect anomalous controller behavior, and to provide an interface for users to view real-time controller/device status information. Although not depicted, the system 104, the IoT device 112, and the system 122 can communicate over one or more communication networks, such as the internet, local area networks (LAN), wide area networks (WAN), virtual private networks (VPN), wired networks, wireless networks, mobile data networks, or any combination thereof The policy generation computer system 104 can receive controller software 102, which can include an operating system and/or applications that are to be run on a controller. The controller software 102 can include binary code, for example, which can be disassembled (e.g., by the policy generation computer system 104) prior to being analyzed to generate a custom security policy. The policy generation computer system 104 can use the controller software to automatically generate a custom security policy 108 for the controller that is to execute the software 102, as indicated by step A (106). For example, the computer system 104 can analyze the software 102 to determine a set of operations and behaviors that are expected during operation of a controller according to the software 102, and can incorporate those operations and behaviors into the custom security policy 108, which may include one or more whitelists of permitted operations and/or behaviors. Generating the security policy can additionally include generating one or more signatures for components of the controller software 102, such as processes/functions that are part of the software 102, that can be used to verify that the code being executed as part of the software 102 is authentic and has not been modified/altered/replaced by malware. By automatically generating a security policy 108 from the controller software 102—meaning without needing manual design for implementation/generation—the system 100 can reduce the burden, cost, and time to generate and implement security layers on controllers, which can increase controller security.

The policy generation can be performed by the computer system 104 in a way that does not necessitate any sort of modification to the controller software 102. For example, the custom policy 108 can be separate from and not rely on modification of the software 102 in order to operate. By generating and implementing the security policy 108 without having to modify or alter the controller software 102, the system 100 can additionally reduce the burden on security layer implementation, which can increase security layer implementation and overall controller security. For example, if the controller software 102 were to be modified in significant ways in order to incorporate the security policy 108, the software 102 would need to be verified and tested again after the security policy 108 has been integrated into the system, which can slow time to deployment and can delay the incorporation of security layers on controllers.

The computer system 104 (and/or other computer systems, such as original equipment manufacturers (OEM)) can load the software 102 and the security policy 108 for the controller 114 of the IoT device 112, as indicated by step B (110). For example, the controller software 102 and the security policy 108 can be flashed onto the controller 114.

The controller 114 can securely operate using the controller software 102, which is confined to operating within the confines of the security policy 108, as indicated by step C (116). For example, the security policy 108 can include whitelists (and other information) that designate authorized behaviors and operations for the controller 114 that are within expected behavior according to the controller software 102. Behaviors/operations that deviate from those authorized behaviors/operations can be prevented from occurring based on the security policy 108 hardening the controller 114 against such behaviors/operations.

For example, the controller software 102 can include one or more portions of code that make the controller 114 unsecure, which can potentially affect the security of not only the controller 114 but the device 112 (and other devices to which it is connected). As described above, security vulnerabilities can come in any of a variety of different types, such as buffer overrun vulnerabilities through which a hacker could potentially modify the software stack to cause malware 120 to be loaded onto and executed by the controller 114. By operating according the security policy 108 on the controller 114, such malware attempts can be blocked before the malware 120 is loaded/executed by the controller 114, as indicated by step D (118).

Such hardening of the controller 114—meaning restriction of the controller 114 to specific behaviors/operations outlined in the security policy 108—can provide endpoint security that provides an early intrusion detection system with a variety of benefits. For example, it can allow for early intrusion detection and warning of attacks by identifying attack attempts before they are able to install/run the malware 120 on the controller 114. It can also stops attacks at the gate—meaning preventing attacks from making it onto the controller 114 and the device 112 (as opposed to other security solutions that attempt to identify malware once it has already been installed/run on a controller). It can eliminate false positives (incorrect identification of attacks) by restricting operation of the controller 114 to only the code and applications that have explicit permission to run on the controller, which can eliminate potential ambiguity (e.g., either the code is part of the factory settings or not). It can also eliminates risk of the policy 108 becoming security vulnerability itself by being outdated. For instance, by custom generating the security policy 108 to match the current version of the controller software 102, the security policy 108 can continue to harden the controller 114 as the controller software 102 is updated over time. Additionally, this is in contrast to other security policies that may use blacklists seeking to identify and prevent particular malware. Such blacklists may require constant updating and may continually run the risk of being outdated, which can expose the controller 114 to potential vulnerabilities. By using whitelists in the security policy 108 that outline permitted behaviors/operations, the security policy 108 can continue to protect the controller 114 even when new and yet unknown malware attempts are launched against the controller 114 and device 112. Quality checks can also be minimized, which can reduce time for deployment and updates. For example, endpoint security layers can be isolated within the controller 114, so there may not be a need to rest the operation of the entire device 112 (or other devices connected to the device 112) as part of the security layer deployment.

The controller 114 can log information about its operation, including blocked malware attempts as well as information on secure operation of the controller 114 over time. Traces of blocked malware attempts can include a variety of information, such as the malware itself, the origin of the malware (e.g., IP address from which the malware originated), and information identifying the code segment that provided the malware exploit. The controller 114 report information on controller operation, as indicated by step E (124). Such reporting can be provided in real-time. For example, the controller 114 can report malware traces in response to the malware 120 is attempt being blocked. The controller 114 can balance reporting with controller performance against the timeliness of reporting for less critical information, such as information about secure operation of the controller 114 during periods of time when no malware attacks were attempted/blocked. For instance, such reports can be delayed until periods of time when the controller 114 and/or the device 112 have at least a sufficient amount of processing capacity and/or network bandwidth available.

The management computer system 122 can receive reports from the controller 114 as well as from multiple other controllers and devices, and can aggregate the reports into a central database system. The reports can be used to provide real-time controller/device information, as indicated by step E (126). For example, the computer system 122 can transmit real-time information that is presented on client computing devices (e.g., mobile computing devices, laptops, desktop computers) in user interfaces, such as the example user interface 130 that includes status information 132 for example controllers C1-C6 and malware information 134 that identifies particular malware that has been blocked by these controllers. The real-time information can be at any of various levels of granularity, such as a device-level (status information for a specific device) and/or a population-level (status information across multiple devices/systems).

The computer system 122 can additionally use the information reported by controllers to detect anomalies, as indicated by step E (128). For example, the computer system 122 can use statistical analysis to identify operation/behaviors that are outside of the normal operation of a controller, such as identifying a sequence of function calls that are a statistical outlier outside of the normal operation of a controller.

Figure 1B:
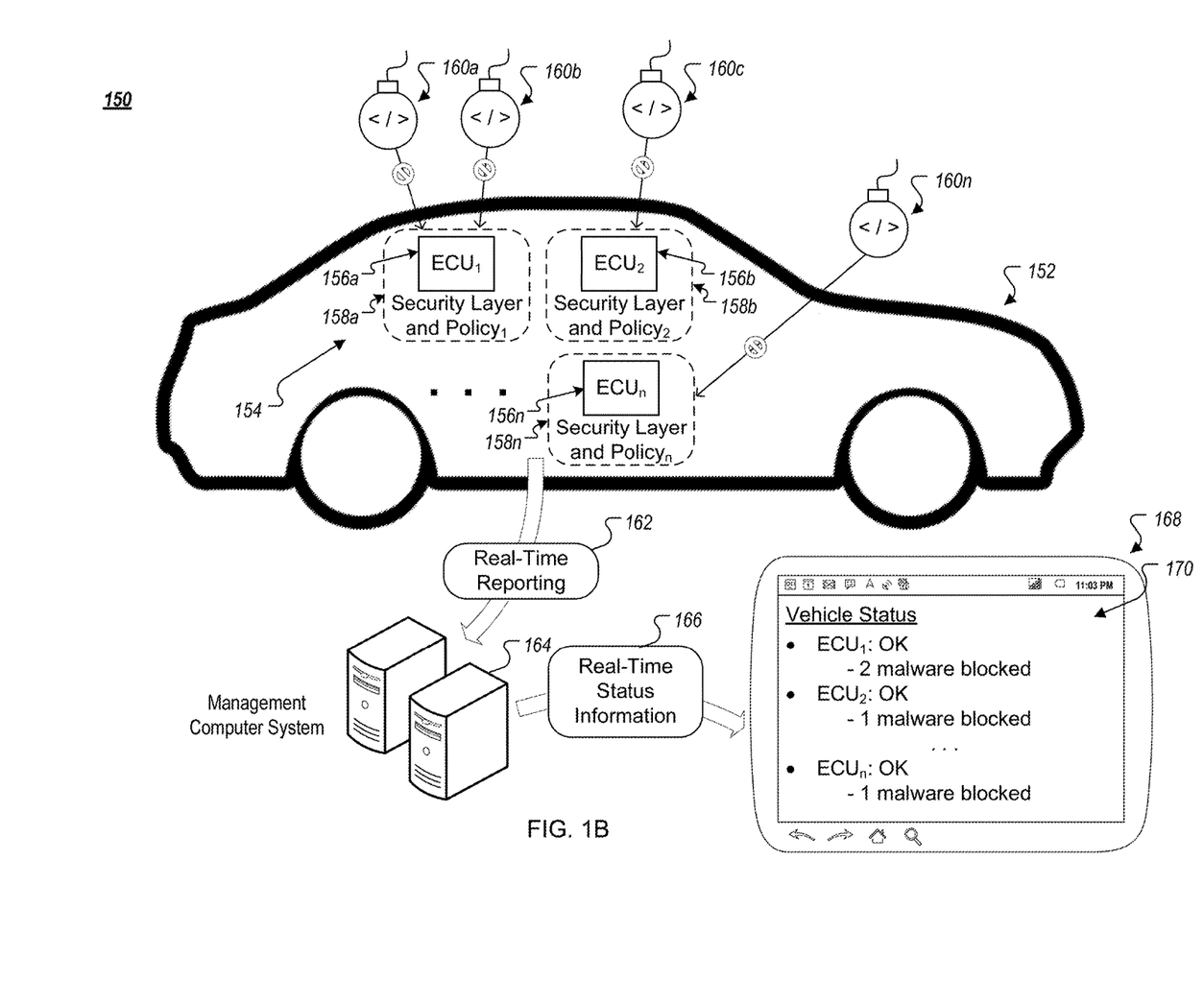
FIG. 1B is a conceptual diagram of an example system for implementing generating and implementing custom security policies on example ECUs that are part of an example vehicle.

FIG. 1B is a conceptual diagram of an example system 150 for implementing generating and implementing custom security policies on example ECUs that are part of an example vehicle 152. The example system 150 is an example implementation of the system 100 to a specific IoT context, which in this example is the vehicle 152. The system 100 and the system 150 can be implemented in a variety of other IoT contexts.

In this example, the vehicle 152 includes a control system 154 that includes multiple ECUs 156a-n that each have their own custom security policy 158a-n. Although not depicted, the security policies 158a-n can be generated in a similar manner described above with regard to FIG. 1A and the policy generation computer system 104. The security policies 158a-n can harden the ECUs 156a-n and can effectively block malware attempts 160a-n, which can be attempts by hackers to find a way into the CAN Bus of the vehicle 152.

While the vehicle 152 can include over a hundred ECUs connected to the CAN Bus, only a few may be open externally (accessible to external networks outside of the vehicle 152, such as the internet). These external ECUs (e.g., ECUs 156a-n) can be the gateways into the car and the security policies 158a-n can stop attackers at these gateways, which can significantly reduce, if not eliminate, the risk of attacks penetrating the car's network, which can disrupt the car's operation.

For example, the security policies 158a-n can include whitelists for permitted program binaries, processes, scripts, network behavior, and/or other devices, and can be embedded within the ECUs 156a-n to ensure only explicitly allowed code and behavior may run on it. By using the security policies 158a-n that are specific to the ECUs 156a-n, any processes or functions that are outside of the ECUs permitted/designed operating behavior can be immediately detected and stopped from running on the ECUs 156a-n. This can allow for the ECUs 156a-n to stop malicious code from ever being executed by and possibly taking control of an ECUs' operation.

For instance, hackers targeting the vehicle 152 can use a "dropper," which is a small piece of code or operation, to try to exploit a vulnerability and implant the malware 160a-n. The malware 160a-n is the code that ultimately tampers with or takes control of the function of the vehicle 152, which can cause significant damage and put the safety of the driver and others on the road at risk. By adding an endpoint security layers and policies 158a-n to ECUs 156a-n so that they use policies outlining whitelists of permitted processes, binaries, etc., the ECUs 156a-n are able to provide an early intrusion detection system capable of early detection of unexpected behavior or operation of a dropper (example intrusions) and immediately report on the attack attempt in real-time, as indicated by step 162. The early intrusion detection and warning can give the original equipment manufacturers (OEMs) and system providers of the vehicle 152 (and its subparts) time to address the threat, as indicated by the computer system 164 providing real-time status information to a client computing device 168 with information 170 on malware that has been blocked across the ECUs 156a-n (step 166). For example, an alert on the malware 160a-n can include the complete trail of the attack on the ECUs 156a-n, including its source and path, so vulnerabilities can be fixed and blocked to prevent any malware from infiltrating the CAN Bus on the vehicle 152.

Dropper and other hacker attempts to introduce the malware 160a-n on the externally connected ECUs 156a-n can be detected by the endpoint security layers and policies 158a-n as foreign code and can be blocked when they attempts to run. For instance, such droppers and other hacker attempts are not part of the factory settings for the ECUs 156a-n, so they can be blocked from running by the security layers and policies 158a-n, which can stop them from running and prevent them from doing anything to disrupt the safe operation of the vehicle 152. If a dropper does succeed in dropping the malware 160a-n onto the externally connected ECUs 156a-n, when the malware 160a-n attempt to run on the ECUs 156a-n, the endpoint security layer and policies 158a-n can detect it as foreign code and block its attempts to run.

Endpoint security layers (e.g., security policy 108, security layer and policies 158a-n) can be implemented on newly deployed controllers and can be retrofitted on previously released controllers that may not have previously included security layers. Such retrofitting can improve the security of devices already in use and can be added as part of regular software updates that drivers receive during regular maintenance and updating. Once retrofitted, previously deployed controllers can be protected with endpoint security will be hardened against the cyber threats targeting them.

Figure 2:
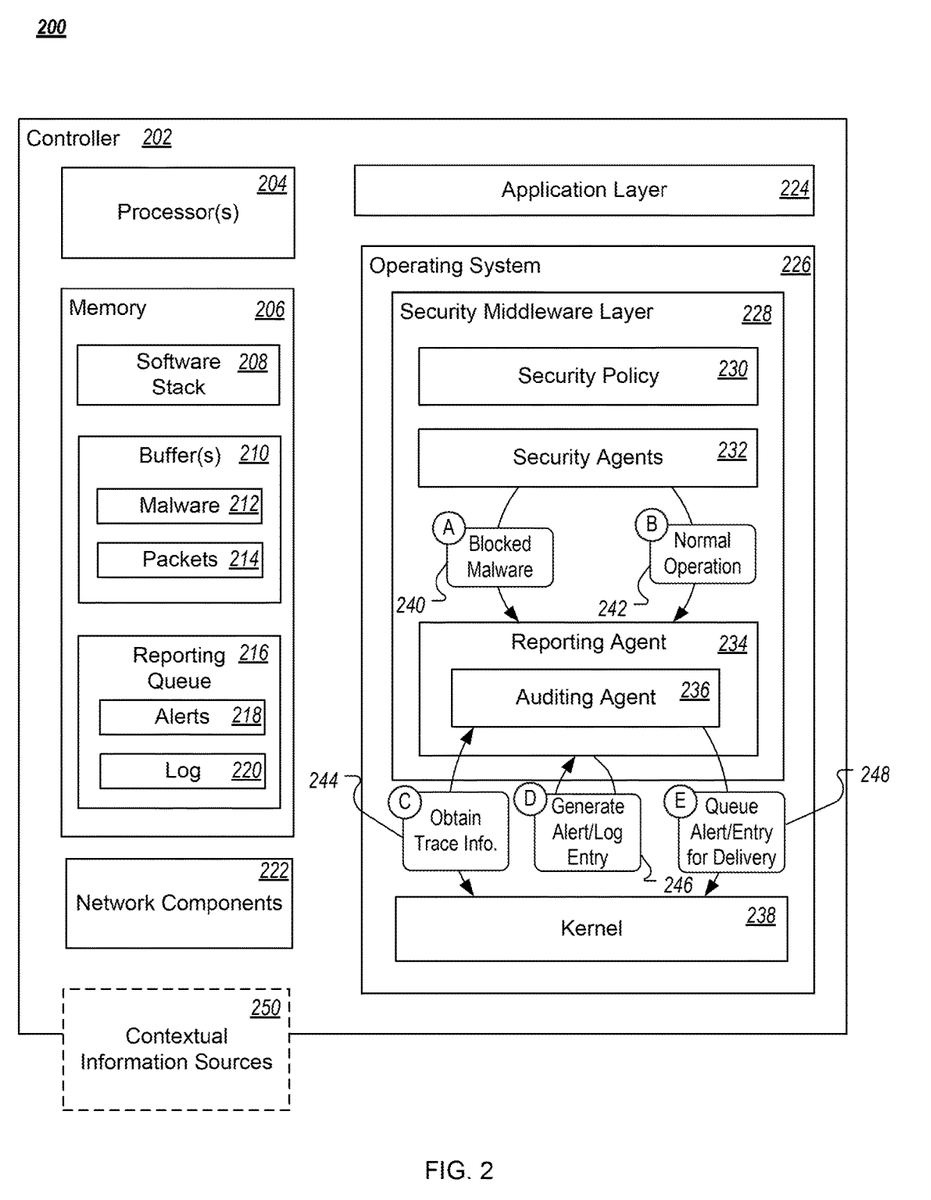
FIG. 2 is a diagram of an example system for reporting and processing controller security information.

FIG. 2 is a diagram of an example system 200 for reporting and processing controller security information. The example system 200 includes a controller 202 that can be similar to the controller 114 protected by security policy 106 and the ECUs 156a-n protected by security policies 158a-n described above with regard to FIGS. 1A-B.

The controller 202 includes an application layer 224 at which one or more applications operate on the controller 202 through use of an operating system 226 for the controller 200. The operating system 204 includes a kernel 238 and the security middleware layer 228, which can restrict operation of the kernel 238 to only known, authorized, and safe services that are authorized by a custom security policy 230 for the controller 202. The kernel 238 includes processes and functions that provide an interface for the operating system 226 to perform operations on the controller 202 using hardware, which includes one or more processors 204 (e.g., CPUs), memory 206 (e.g., volatile memory, non-volatile memory, RAM), and input/output (I/O) network components 222 (e.g., wired and wireless network cards/chip sets, network interface cards (NIC)). The kernel 238 includes functions/process that direct operation of the hardware, such as program loading (e.g., functions and processes to load processes into a software stack 208 in memory 206 for execution by the processor(s) 204), in-memory services (e.g., functions to allocate information into and out of memory 206), networking services (e.g., processes to open network sockets and to transmit/receive network packets), and peripheral device processes (e.g., processes to interface with peripheral devices).

The security middleware layer 226 includes security agents 232 that can provide multiple different layers of security and that can implement the security policy 230 on the controller 202. The security agents 232 can, for example, verify processes that are preformed and network packets that are transmitted/received by the controller 202. The security middleware layer 238 additionally includes a reporting agent 234 that can collect and report forensic information and alerts on security threats, such as malware dropping attempts, as well as information on normal operation of the controller 202. The security middleware layer 228 can harden the controller 202 against malwares and other security threats, and can be integrated into the operating system 226 of the controller 202, in kernel and system levels, which can include enforcement as well as reporting and forensics capabilities through the reporting agent 234. For example, the security middleware layer 228 (and/or its individual components) can be registered as one or more drivers with the kernel 228 to be executed in response to various action being performed at a kernel level, such as particular functions that are part of the kernel processes being called.

The reporting agent 234 can incorporated into the security middleware layer 228 by, for example, being invoked/called by the security agents 232 whenever the security agents 232 block malware attacks, as indicated by step A (240), and/or whenever they determine that the controller is operating normally (no malware attack detected), as indicated by step B (242). The reporting agent 234 can collect forensic trace information on system workflows within the controller 202. This collection can be automatically adjusted and optimized based on controller 202 performance, memory usage, and/or storage limitations. The reporting agent 234 can be designed to obtain and report relevant information, but to also do so while minimally impacting performance of the controller 202. Periodically and upon attack attempts, the forensic information is reported to a server system (e.g., management computer system 122, management computer system 164) for reporting and further analysis.

For example, the reporting agent 234 can automatically analyze attack attempts (blocked malware 240), including identifying the attacker's entry point (exploit in the operating system 226) and reporting that information to the vendor to be addressed and fix the vulnerability. The reporting agent 234 can further include an auditing agent 236 that is an internal component that collects activity traces, stores them in a queue 216 (e.g., compressed cyclic buffer) for transmission, and sends them, when needed, to the backend server system (management computer system 122, management computer system 164), which may reside on either a security provider's data center or at a vendor/manufacturer's data center.

For example, in response to receiving an indication that malware has been blocked (240) and/or that the security agents 232 have determined the controller 202 is operating normally (242), the reporting agent 234 can request the auditing agent 236 to obtain trace information, as indicated by step C (244). Obtaining trace information can involve the auditing agent 236 transmitting requests to the kernel 238 for information that is stored in memory 206, including information contained within the software stack 208 indicating processes that are being performed by the controller 202 (as well as a sequence of processes that are being performed) and/or information that has been blocked by the security middleware layer 228 that is stored in one or more buffers 210 used by the controller 202 (e.g., blocked malware 212, blocked network packets 214).

The auditing agent 236 can additionally call to the kernel 238 to obtain information on the current state of the controller 202, such as current resource usage (e.g., processor 204 usage, memory 206 usage, network transmission levels using the networking components 222) and/or current network connections established by the network components 222 (e.g., Wi-Fi, cellular network).

The auditing agent 236 can additionally call to the kernel 238 to obtain information on a current context within which the controller 202 currently exists/resides, which can be a broader external state beyond than the current internal state of the controller 202. For example, the current context can include information about a device/system that the controller 202 is controlling (e.g., infotainment center in a vehicle), information about a broader system of which the controller 202 is a part (e.g., collection of ECUs that together provide control operations within a vehicle), and/or other appropriate information. Obtaining context information may include accessing contextual information sources 250 through the kernel 238. Contextual information sources 250 may be local to the controller 202 or they may be external, such as being provided by one or more other controllers that are part of a system that the controller 202 is a part of (e.g., collection of ECUs in a vehicle). Such information can include, for instance, a current physical location (e.g., geolocation), a current operational state of the system (e.g., vehicle driving, vehicle idling), and/or other appropriate context information.

Having obtained relevant information, the reporting agent 234 and the auditing agent 236 an generate an alert (for blocked malware attempts) or a log entry (for normal operation), as indicated by step D (246). Alerts and logs can be used to provide information to a backend system (management computer system 122, management computer system 164) about a current state of the controller 202, which can be combined with information from other controllers to provide a global view of the security state of a population of controllers/devices.

Generated alerts and log entries can be delivered to a reporting queue 216 for delivery to a backend system, as indicated by step E (248). For example, the alerts 218 can be loaded into the reporting queue 216 and the log entries 220 can be loaded into a reporting queue 216. The reporting queue 216 can be designed to handle alerts 218 differently than log entries 220, and may prioritize the transmission of the alerts 218 over the log entries 220. For example, the reporting queue 216 can transmit the alerts 218 immediately upon receiving them and regardless of a current capacity of the network components 222. In contrast, the log entries 220 (detailing normal behavior) can be entered into a buffer that is flushed at appropriate times, such as when the network components 222 have sufficient capacity to transmit the contents of the buffer. The buffer may have a limited or fixed size, and allow for non-transmitted log entries not yet transmitted to be overwritten with new log entries in the event that the network components 222 did not have sufficient capacity while the non-transmitted log entries were awaiting transmission in the buffer. Since log entries 220 are not as critical as the alerts 218, losing some log entries 220 in order to reduce performance impacts on the controller 202 (e.g., minimize memory usage for log entries 220, restrict network transmissions to times when the networking components 222 have sufficient capacity) can be a fair tradeoff. In contrast, alerts 218 can be prioritized and may not be dropped in lieu of system performance gains.

In addition to including a variety of information, such as trace information, controller information, and/or context information, the alerts 218 can include actual copies of the blocked malware 212 and/or blocked network packets 214. Such information can be used by the backend system to better understand the security threat that was blocked and the exploit in the operating system 226 that permitted the security threat to reach the controller 202.

Although not depicted, the reporting agent 234 and the auditing agent 236 can additionally include features to compress the size of alerts and logs that are transmitted to the backend system. For example, the reporting agent 234 and the auditing agent 236 can compress the information being transmitted using one or more data compression techniques, such as through using a dictionary to abbreviate particular common bits of information with less information. Other compression techniques can also be used.

Figure 3A:
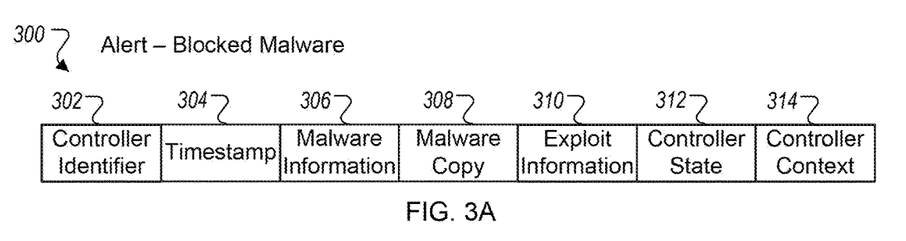
FIGS. 3A-C depict example alert and log information that can be generated and transmitted by a reporting agent to a backend server system.
Figure 3B:
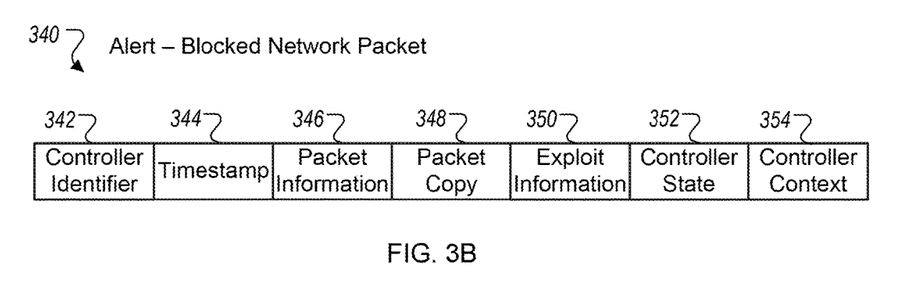
Figure 3C:
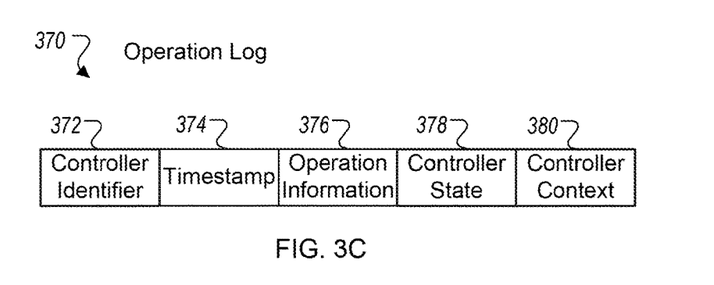

FIGS. 3A-C depict example alert and log information that can be generated and transmitted by a reporting agent, such as the reporting agent 234, to a backend server system, such as the management computer system 122 and/or the management computer system 164. FIG. 3A depicts an example alert 300 for blocked malware attempts. FIG. 3B depicts an example alert 340 for blocked network packets. FIG. 3C depicts an example log entry 370.

Referring to FIG. 3A, the blocked malware alert 300 can include a variety of information, such as a controller identifier 302 that can uniquely identify the controller blocking the malware with a backend server system, a timestamp 304 at which the malware attempt was blocked on the controller, malware information 306 that can identify information about the malware attack (e.g., trace information), a copy 308 of the malware that was blocked, exploit information 310 identifying the exploit on the controller that the malware attempted to use to gain access to the controller, controller state information 312 that can identify a current state for the controller (e.g., resource usage information, network connections), and controller context information 314 that can identify a broader context within which the controller currently exists (e.g., vehicle location, vehicle operational state). Additional information can also be included in the alert 300. Alternatively, the alert 300 can include only portions or sub-combinations of this example information.

Referring to FIG. 3B, the blocked network packet alert 340 can include a variety of information, such as a controller identifier 342 that can uniquely identify the controller blocking the network packet with a backend server system, a timestamp 344 at which the network packet was blocked on the controller, network packet information 346 that can identify information about the network packet transmission that was attempted (e.g., trace information), a copy 348 of the network packet that was blocked, exploit information 350 identifying the exploit on the controller that the network packet attempted to use to gain access to the controller, controller state information 352 that can identify a current state for the controller (e.g., resource usage information, network connections), and controller context information 354 that can identify a broader context within which the controller currently exists (e.g., vehicle location, vehicle operational state). Additional information can also be included in the alert 340. Alternatively, the alert 340 can include only portions or sub-combinations of this example information.

Referring to FIG. 3C, the operation log 370 can include a variety of information, such as a controller identifier 372 that can uniquely identify the controller blocking the network packet with a backend server system, a timestamp 374 at which the operation that is the subject of the log was performed, operation information 376 that can identify information about the operation that was performed (e.g., trace information), controller state information 378 that can identify a current state for the controller (e.g., resource usage information, network connections), and controller context information 380 that can identify a broader context within which the controller currently exists (e.g., vehicle location, vehicle operational state). Additional information can also be included in the log 370. Alternatively, the log 370 can include only portions or sub-combinations of this example information.

Figure 4:
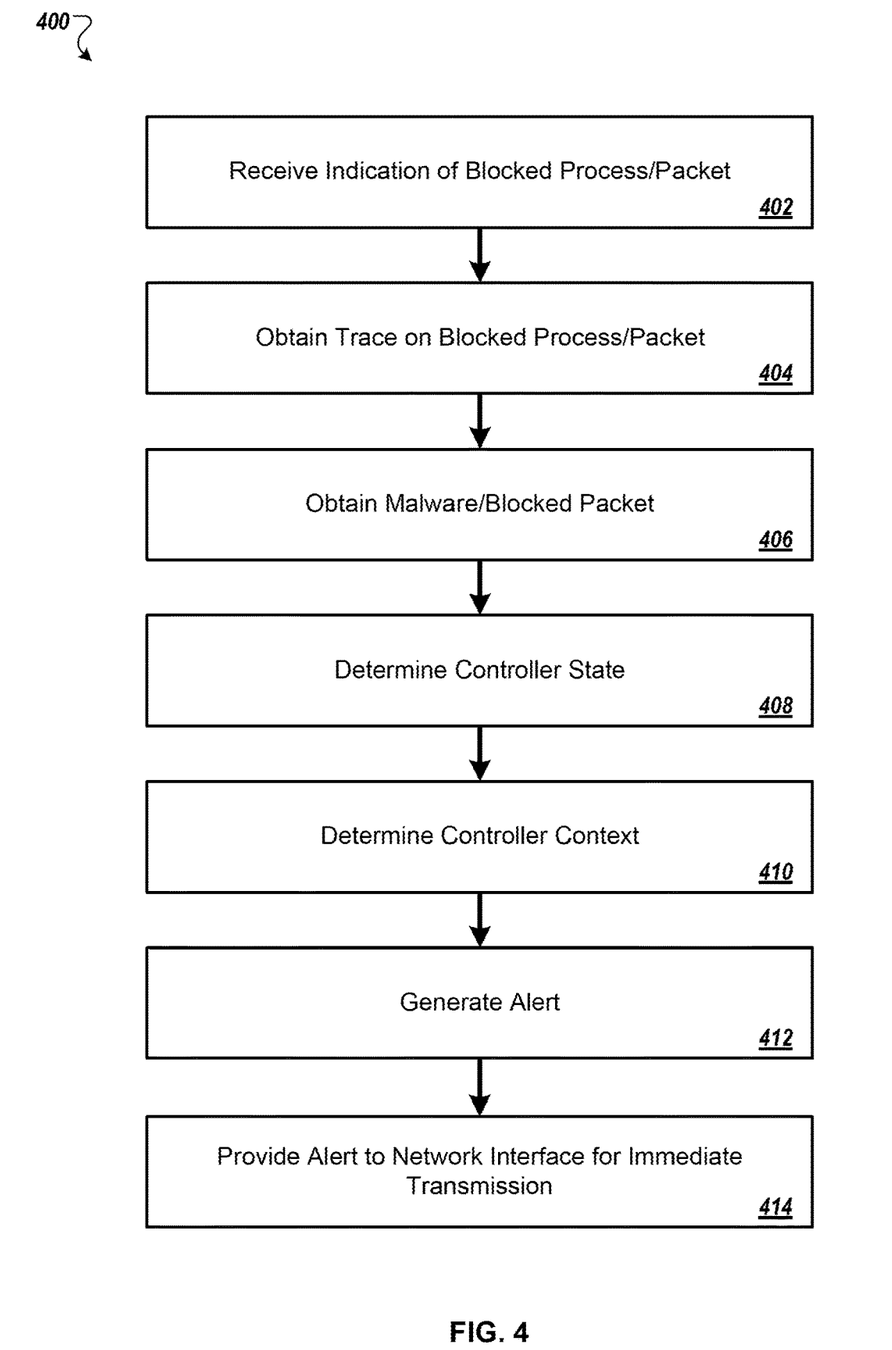
FIG. 4 is a flowchart of an example technique for generating and transmitting an alert related to an attempted malware attack.

FIG. 4 is a flowchart of an example technique 400 for generating and transmitting an alert related to an attempted malware attack. The example technique 400 can be performed, for example, by a reporting agent, such as the reporting agent 234 that is part of the security middleware layer 228 on the controller 202.

An indication of a blocked process/network packet can be received (402). For example the security agents 232 call the reporting agent 234, passing information about blocked malware attempt and/or network packets (e.g., identifier for the blocked process, pointer to the malware 212 and/or packets 214). A trace can be obtained on the blocked process/network packet (404). For example, the auditing agent 236 can make calls to the kernel 238 to obtain a trace of the blocked process/network packet, including information identifying the malware/network packet and the exploit in the operating system 226 that permitted the malware/network packet to reach the controller 202. Copies of the blocked malware/network packet can be obtained (406). For example, the auditing agent 236 can access copies of the blocked malware 212 and/or packets 214 stored in one or more buffers 210 from memory 206. A current state of the controller can be determined (408) and/or a current controller context can be determined (410). For example, the auditing agent 236 can access processes in the kernel 238 to determine the current state of the controller 202 (e.g., resource usage, current network connections) and to access contextual information sources 250. Using the obtained and determined information, an alert can be generated (412) and provided to a network interface for immediate transmission (414). For example, the auditing agent 236 can transmit the alert to the reporting queue 216 with prioritization so that the alert is transmitted with minimal delay.

Figure 5:
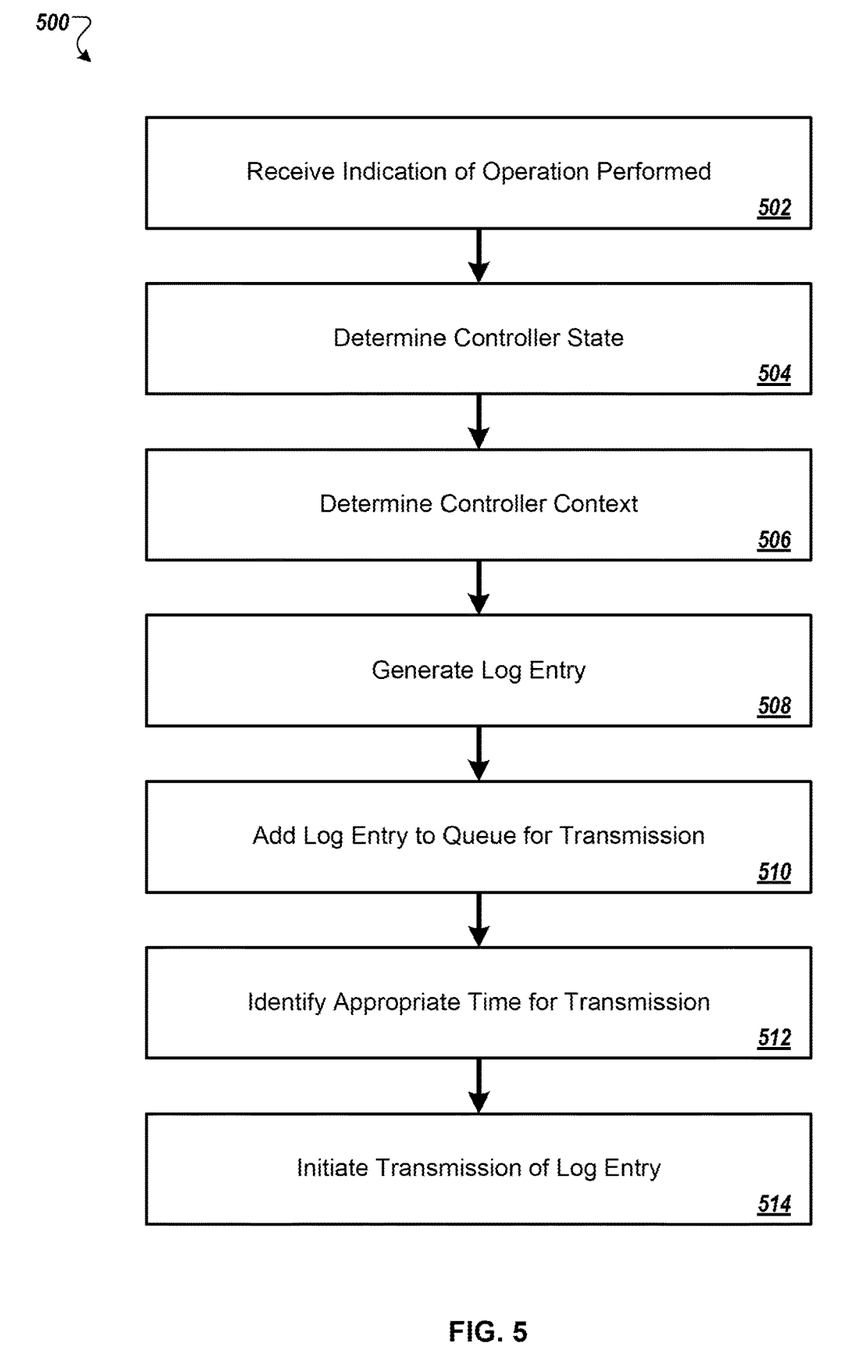
FIG. 5 is a flowchart of an example technique for generating and transmitting logs related to normal operation on a controller.

FIG. 5 is a flowchart of an example technique 500 for generating and transmitting logs related to normal operation on a controller. The example technique 500 can be performed, for example, by a reporting agent, such as the reporting agent 234 that is part of the security middleware layer 228 on the controller 202.

An indication of a performed operation can be received (502). For example the security agents 232 call the reporting agent 234, passing information about operations that have been permitted by the security agents 232 under the security policy 230. A current state of the controller can be determined (504) and/or a current controller context can be determined (506). For example, the auditing agent 236 can access processes in the kernel 238 to determine the current state of the controller 202 (e.g., resource usage, current network connections) and to access contextual information sources 250. Using the obtained and determined information, a log for the operation can be generated (508) and added to queue for transmission (510). For example, the auditing agent 236 can transmit the log to the reporting queue 216 for transmission. An appropriate time for transmission can be identified (512) and the log entry can be transmitted (514). For example, the log entry can be transmitted from the reporting queue 216 when the network components 222 have at least a threshold level of available transmission bandwidth.

Figure 6:
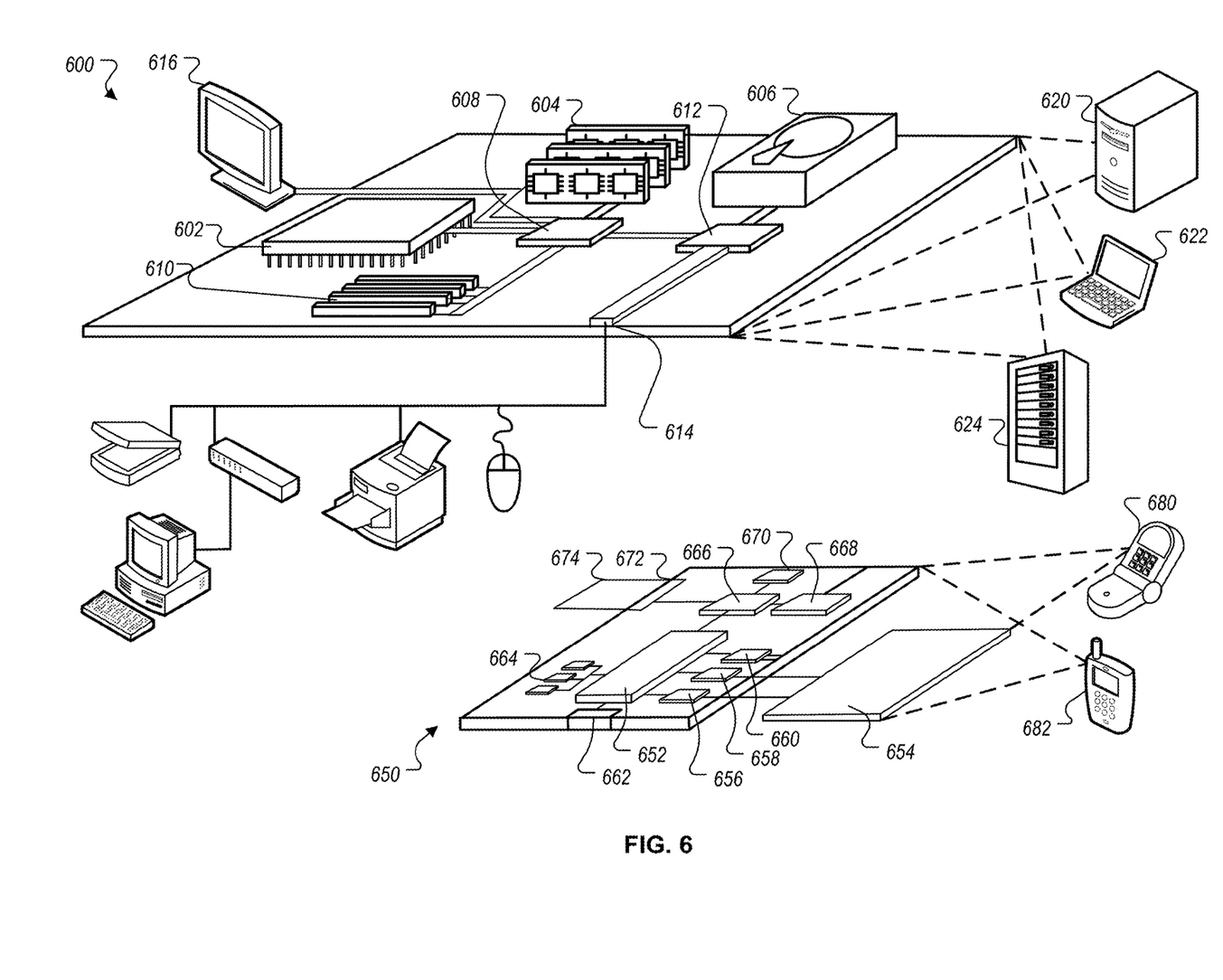
FIG. 6 is a block diagram of example computing devices.

FIG. 6 is a block diagram of example computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent any other typically non-mobile devices, such as televisions or other electronic devices with one or more processors embedded therein or attached thereto. Computing device 650 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed controller 608 connecting to memory 604 and high-speed expansion ports 610, and a low-speed controller 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed bus 614. The low-speed bus 614 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as computing device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The computing device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the computing device 650, such as control of user interfaces, applications run by computing device 650, and wireless communication by computing device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of computing device 650 with other devices. External interface 662 may provide, for example, for wired communication (e.g., via a docking procedure) or for wireless communication (e.g., via Bluetooth® or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to computing device 650 through expansion interface 672, which may include, for example, a subscriber identification module (SIM) card interface. Such expansion memory 674 may provide extra storage space for computing device 650, or may also store applications or other information for computing device 650. Specifically, expansion memory 674 may include instructions to carry out or supplement the processes described above, and may include secure information also. Thus, for example, expansion memory 674 may be provide as a security module for computing device 650, and may be programmed with instructions that permit secure use of computing device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Computing device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 668 (e.g., a radio-frequency transceiver). In addition, short-range communication may occur, such as using a Bluetooth®, WiFi, or other such transceiver (not shown). In addition, GPS receiver module 670 may provide additional wireless data to computing device 650, which may be used as appropriate by applications running on computing device 650.

Computing device 650 may also communicate audibly using audio codec 660, which may receive spoken information from a user and convert it to usable digital information. Audio codec 660 may likewise generate audible sound for a user, such as through a speaker, e.g., in a handset of computing device 650. Such sound may include sound from voice telephone calls, may include recorded sound (e.g., voice messages, music files, etc.) and may also include sound generated by applications operating on computing device 650.

The computing device 650 may be implemented in a number of different forms, as shown in the figure. For example, it may be implemented as a cellular telephone 680. It may also be implemented as part of a smartphone 682, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for providing security on externally connected electronic control units (ECUs), the method comprising:

receiving, at a reporting agent that is part of a security middleware layer operating on an ECU, an indication that a process has been blocked;

obtaining, by the reporting agent, trace information for the blocked process;

determining, by the reporting agent, a code portion in an operating system of the ECU that served as an exploit for the blocked process;

obtaining, by the reporting agent, a copy of malware that was to be executed by the blocked process;

determining, by the reporting agent, a current context of the ECU;

generating, by the reporting agent, an alert for the blocked process that includes (i) the trace information, (ii) information identifying the code portion, (iii) the copy of the malware, and (iv) information identifying the current context of the ECU; and providing, by the reporting agent, the alert to a network interface on the ECU for immediate transmission to a backend computer system.

2. The method of claim 1, further comprising:

determining, by the reporting agent, a current status of the ECU, wherein information identifying the current status is additionally included in the alert.

3. The method of claim 2, wherein the current status includes current levels of use for one or more resources on the ECU.

4. The method of claim 3, wherein the one or more resources include a processor, memory, and networking transmission capacity through the network interface.

5. The method of claim 2, wherein the current status includes current network connections that are established for the ECU through the network interface.

6. The method of claim 2, wherein the current status includes a snapshot of a software stack that identifies current process calls on the ECU.

7. The method of claim 1, wherein the current context includes a geographic location where the ECU is currently located.

8. The method of claim 1, wherein the current context includes a current operational state for a device or system of which the ECU is a part.

9. The method of claim 8, wherein the ECU is in data communication with other ECUs in a vehicle.

10. The method of claim 1, wherein the security middleware layer further comprises (i) a custom security policy defining permitted operations on the ECU and (ii) one or more security agents that operate at a kernel-level on the ECU to enforce the security policy.

11. A non-transitory computer readable medium including instructions that, when executed by at least one processor, cause the at least one processor to perform operations for providing security on externally connected electronic control units (ECUs), the operations comprising:

receiving, at a reporting agent that is part of a security middleware layer operating on an ECU, an indication that a process has been blocked;

obtaining, by the reporting agent, trace information for the blocked process;

determining, by the reporting agent, a code portion in an operating system of the ECU that served as an exploit for the blocked process;

obtaining, by the reporting agent, a copy of malware that was to be executed by the blocked process;

determining, by the reporting agent, a current context of the ECU;

generating, by the reporting agent, an alert for the blocked process that includes (i) the trace information, (ii) information identifying the code portion, (iii) the copy of the malware, and (iv) information identifying the current context of the ECU; and providing, by the reporting agent, the alert to a network interface on the ECU for immediate transmission to a backend computer system.

12. The non-transitory computer readable medium of claim 11, further comprising:

determining, by the reporting agent, a current status of the ECU, wherein information identifying the current status is additionally included in the alert.

13. The non-transitory computer readable medium of claim 12, wherein the current status includes current levels of use for one or more resources on the ECU.

14. The non-transitory computer readable medium of claim 13, wherein the one or more resources include a processor, memory, and networking transmission capacity through the network interface.

15. The non-transitory computer readable medium of claim 12, wherein the current status includes current network connections that are established for the ECU through the network interface.

16. The non-transitory computer readable medium of claim 12, wherein the current status includes a snapshot of a software stack that identifies current process calls on the ECU.

17. The non-transitory computer readable medium of claim 12, wherein the current context includes a geographic location where the ECU is currently located.

18. The non-transitory computer readable medium of claim 12, wherein the current context includes a current operational state for a device or system of which the ECU is a part.

* * * * *